(12) United States Patent
Jariwala et al.

(10) Patent No.: US 9,367,049 B2
(45) Date of Patent: Jun. 14, 2016

(54) FABRICATING PARTS FROM PHOTOPOLYMER RESIN

(75) Inventors: Amit S. Jariwala, Atlanta, GA (US); David W. Rosen, Marietta, GA (US); Fei Ding, Kennesaw, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 317 days.

(21) Appl. No.: 13/810,494

(22) PCT Filed: Jul. 15, 2011

(86) PCT No.: PCT/US2011/044171
§ 371 (c)(1),
(2), (4) Date: Jan. 16, 2013

(87) PCT Pub. No.: WO2012/009630
PCT Pub. Date: Jan. 19, 2012

(65) Prior Publication Data
US 2013/0123988 A1    May 16, 2013

Related U.S. Application Data

(60) Provisional application No. 61/364,948, filed on Jul. 16, 2010.

(51) Int. Cl.
*G05B 11/01* (2006.01)
*B29C 67/00* (2006.01)

(52) U.S. Cl.
CPC ............ *G05B 11/01* (2013.01); *B29C 67/0066* (2013.01); *B29C 67/0088* (2013.01)

(58) Field of Classification Search
CPC . B29C 67/0066; B29C 67/0088; G05B 11/01
USPC ...................................... 702/31, 32; 700/266
See application file for complete search history.

(56) References Cited

U.S. PATENT DOCUMENTS

| | | |
|---|---|---|
| 5,345,391 A | 9/1994 | Hull et al. |
| 6,366,825 B1 | 4/2002 | Smalley et al. |
| 2007/0032896 A1 | 2/2007 | Ye et al. |
| 2007/0118243 A1* | 5/2007 | Schroeder et al. ............ 700/118 |
| 2007/0225851 A1 | 9/2007 | Prager et al. |
| 2009/0027681 A1* | 1/2009 | De Vlaminck et al. ....... 356/445 |
| 2009/0250828 A1 | 10/2009 | Rosen et al. |

FOREIGN PATENT DOCUMENTS

WO    WO2010045951 A1    4/2010

OTHER PUBLICATIONS

Notification Concerning Transmittal of International Preliminary Report on Patentability for PCT/US2011/044171 mailed on Jan. 31, 2013, 9 pages.
Zhao "Process planning for thick-film mask projection micro stereolithography." Master's Thesis, Georgia Institute of Technology [online], Mar. 26, 2009 [Retrieved on Nov. 17, 2011], Retrieved from the Internet: <URL: http://smartech.gatech.edu/handle/1853/28097>, Abstract only, 2 pages.
Notification of Transmittal of the International Search Report and the Written Opinion of the International Searching Authority, or the Declaration for PCT/US2011/044171 mailed Dec. 6, 2011, 10 pages.

* cited by examiner

*Primary Examiner* — Shogo Sasaki
(74) *Attorney, Agent, or Firm* — Troutman Sanders LLP; Ryan A. Schneider; Alexis N. Simpson

(57) ABSTRACT

Methods, systems, and apparatus, including computer programs encoded on a computer storage medium, for fabricating parts from photopolymer resin. In one aspect, a method includes iteratively determining a deviation measurement based on a simulated cured geometry and adjusted target geometry data until the deviation measurement is at or less than a threshold. The simulated cured geometry is determined, based in part, on an inhibition model.

12 Claims, 5 Drawing Sheets

US 9,367,049 B2

FABRICATING PARTS FROM PHOTOPOLYMER RESIN

CROSS-REFERENCE TO RELATED APPLICATIONS

This application is a National Stage application under 35 U.S.C. 371 of International Application No. PCT/US2011/044171, having an International Filing Date of Jul. 15, 2011, which claims priority under 35 USC §119(e) to U.S. Patent Application Ser. No. 61/364,948, filed on Jul. 16, 2010, the entire contents of which are hereby incorporated by reference.

BACKGROUND

This specification relates to photopolymerization of liquid resins.

Stereolithography is a photopolymerization process in which liquid photopolymer resin is cured in presence of light. Incident radiation, patterned by a dynamic mask, passes through a transparent substrate to cure a photopolymer resin. By controlling the amount of exposure, the height and shape of the cured part can be controlled.

However, many factors cause a cured part to deviate from an expected geometry for a given exposure. Such factors include resin cure kinetics and the system optics. These factors make it difficult to obtain a desired geometry on a flat or curved substrate.

SUMMARY

In general, one innovative aspect of the subject matter described in this specification can be embodied in methods that include the actions of accessing, by a data processing apparatus, target geometry data defining a target geometry of an apparatus to be generated from a photopolymer resin by the projection lithograph system; setting adjusted target geometry data equal to the target geometry data, the output model defining an output geometry of an apparatus to be generated from a photopolymer resin by the projection lithography system; iteratively determining a first deviation measurement based on a simulated cured geometry and the adjusted target geometry data until the first deviation measurement is at or less than a threshold, wherein each iteration comprises: determining, by the data processing apparatus, first image data defining at least one image that is used to control irradiation of the photopolymer resin in a resin chamber, the first image data being based on the adjusted target geometry data, determining, by the data processing apparatus, the simulated cured geometry based on an oxygen inhibition model of the photopolymer resin and the first image data, determining the first deviation measurement based on the simulated cured geometry and the target geometry, comparing the first deviation measurement to a convergence threshold, and adjusting the adjusted target geometry data by an adjustment factor when the first deviation measurement is greater than the convergence threshold; and providing the first image data to a projection lithography system when the first deviation measurement is less than or equal to the convergence threshold. Other embodiments of this aspect include corresponding systems, apparatus, and computer programs, configured to perform the actions of the methods, encoded on computer storage devices.

The systems and methods described in this specification provide for a highly flexible process for fabricating parts with micron shaped features on flat, stepped or curved substrates. These parts can be micro lenses used in cameras, diffusers, backlit display devices, fiber optics, etc., or microfluidic devices used in biochips for biomedical research and clinical technologies. In some implementations, a system provides a reliable control over the fabrication process using an Exposure Controlled Projection Lithography' (ECPL). The system directs light into a liquid photopolymer resin that is solidified upon irradiation through a transparent substrate. The system accurately controls the photo polymerization process during fabrication by taking into account resin cure kinetics. In particular, the complex chemical reactions of the resin are modeled to determine parameter values to drive a dynamic soft mask to control the amount of the exposure of the resin.

Since the process is based on the precise micron scale control, a system implementing the process can accurately fabricate parts with varying desired dimensions without significant change in the system setup or additional operations. This process flexibility provides substantial advantage over existing processes, which require specialized tooling and multiple etching/cleaning procedures. The disclosed process also allows the use of stepped or curved transparent substrates, as any transparent substrate would allow light to pass though, irrespective of its shape. This unique ability to use different substrate shapes enables the fabrication of non-spherical lenses of varying focal lengths on stepped/curved substrates. Such applications include fabrication of advanced imaging and projection devices. The process can be easily scaled for mass production by step and repeat or replication methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

1.0 Overview

The system and methods described in this specification implement a model to integrate the actual optical performance of the system and the complex chemical kinetics to generate process parameters required to generate parts of desired geometries from photopolymers. The proposed fabrication process realizes accurate control over the growing curing front resulting from photopolymerization. In some implementations, complex chemical simulations realize an accurate estimation of the curing front by incorporating the presence of various phenomena, such as oxygen diffusion during the curing process, heat and mass transfer across layers, etc., involved in photopolymerization. The system and methods, in variations of this implementation, use measurements from experimental results to generate the process parameters.

Figure 1:
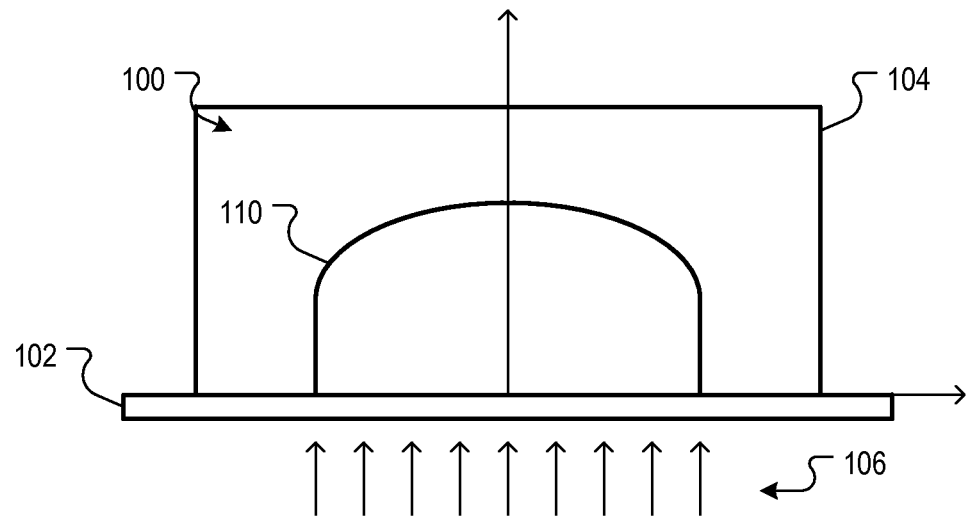
FIG. 1 is an illustration of a polymerization process in which a photopolymer resin is being cured on a transparent substrate.

FIG. 1 is an illustration of a polymerization process in which a photopolymer resin 100 is being cured on a transparent substrate 102. The resin 100 is held in a resin chamber 104 that is affixed to the transparent substrate 102. An irradiation source provides energy, e.g., ultraviolet light 106, according to a controlled exposure. As a result, a portion of the resin 100 is cured to form an apparatus 110 of a desired geometry. As used herein, a "geometry" with respect to a part is the shape of the part with respect to at least two axes, and typically three axes.

As described above, the eventual shape of the cured apparatus 110 depends, in part, on the particular chemical kinetics during curing. Additional factors including optical self-focusing, developing effects, developer erosion, mechanical erosion, and shrinkage can also be modeled. Each of these factors, described in more detail below, can be accounted for when determining the process parameters.

Optical self focusing occurs during the curing of the part. As the cured part geometry continues to build, the cured part acts as a lens, focusing the rays of light towards the center of the cured part. This leads to building a part with progressively smaller widths as the part height increases. In some implementations, the systems and methods estimate the effect of optical self-focusing by adding an iterative process that determines self-focusing at various heights, as described in more detail below.

Developer erosion occurs when the cured part is separated from the liquid monomer. This occurs when a surfactant solution and a solvent is used to remove the liquid monomer from the cured part. When using a surfactant solution, the solution displaces most of the uncured monomer from the substrate by reducing the surface tension. The solvent causes a chemical erosion process that is a result of the interaction of the organic solvent with the uncured monomer still left on the surface of the cured part.

Mechanical erosion occurs when the liquid monomer is removed by air pressure or spinning. The erosion can be measured for a particular system. Finally, shrinkage occurs as the liquid resin polymerizes and increases in density. This causes residual stresses within the cured part that leads to shrinkage of the final cured part. Published material data sheets for the resin/raw material list the shrinkage values can be used to estimate the effect of shrinkage on the overall shape of the cured part.

1.1 Example System

Figure 2A:
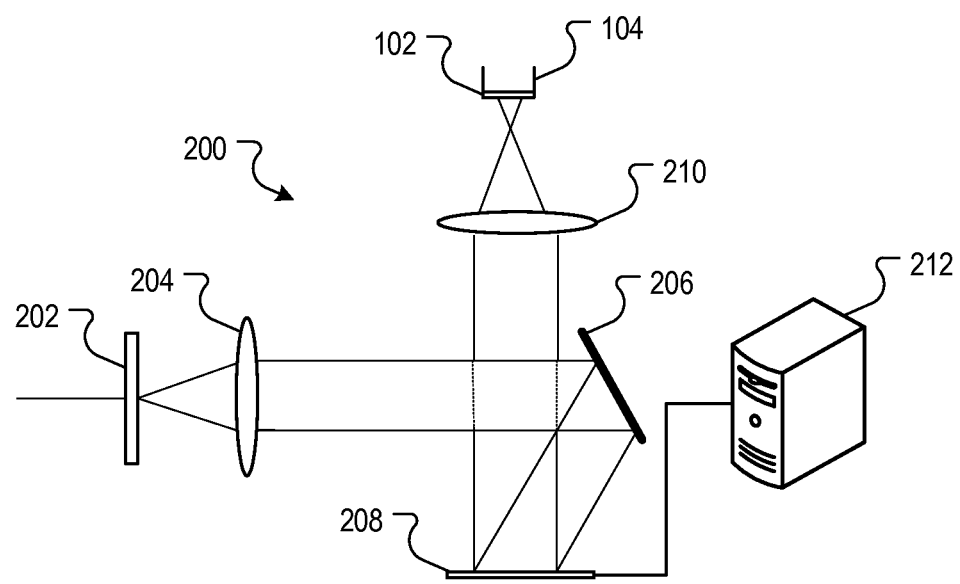
FIG. 2A is a system diagram of projection lithography apparatus.
Figure 2B:
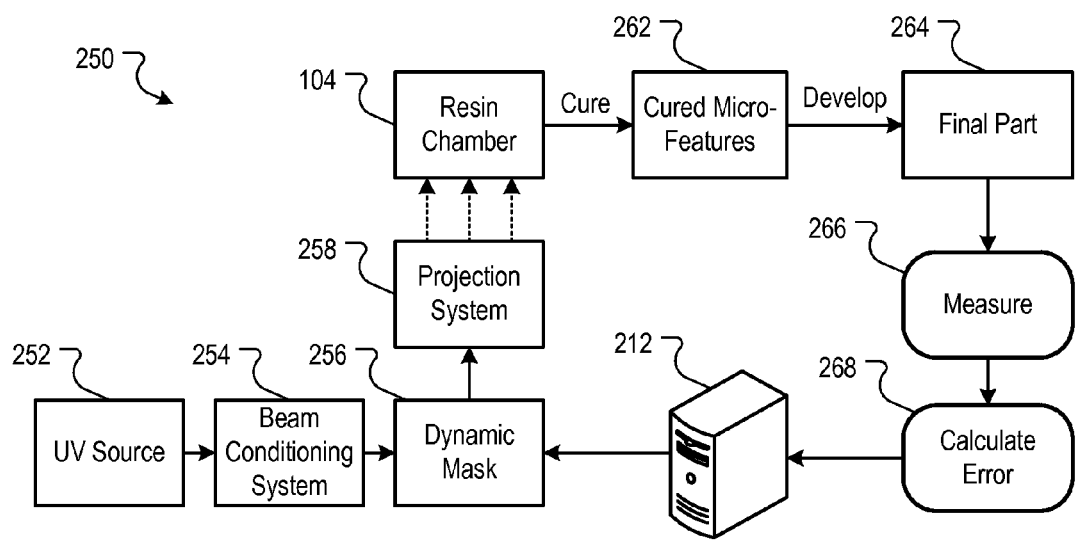
FIG. 2B is a system diagram and example process for curing a photopolymer resin in a projection lithography system that utilizes the example apparatus of FIG. 2A.

FIG. 2A is a system diagram of projection lithography apparatus 200, and FIG. 2B is a system diagram and example process for curing a photopolymer resin in a projection lithography system that utilizes the example apparatus of FIG. 2A. The apparatus 200 includes a diffuser 202 that diffuses irradiation energy (e.g., the output from a laser) for a collimating lens 204. The lens 204 focuses the irradiation energy onto a mirror 206, which, in turn, reflects the energy to a digital micro-mirror device (DMD) 208. Together diffuser 202, lens 204 and mirror 206 form one example implementation of the beam conditioning system 254 of FIG. 2B. In one example implementation, the beam conditioning system 254 includes an ultra-violet (UV) laser light source that emits 38.5 mW at a wavelength of 325 nm at a diameter of 1.5 mm and that is provided to a beam expander. The beam expander, in some implementations, includes two lenses placed after the laser source to enlarge the beam from the diameter of 1.5 mm to 15.0 mm. The first lens is a UV Fused Silica Plano-Concave Lenses with an effective focal length of −20 mm, a diameter of 12.7 mm, a radius of surface 1 of 9.2 mm, a radius of surface 2 of infinity, a thickness of 2.0 mm, and a material refractive index of 1.460. The second lens is UV Fused Silica Plano-Convex Lenses with an effective focal length of 25 mm, a diameter of 25.4 mm, a radius of surface 1 of 115.0 mm, a radius of surface 2 of infinity, a thickness of 2.7 mm, and a material refractive index of 1.460. Other lens configuration can also be used.

The diffuser 202, in some implementations, is a substrate of 1"×1", 2 mm thick plate of fused silica etched with microlenses with high transmission at a wavelength of 325 nm. The diffuser 202 has an illumination scatter pattern of a circle with a divergence angle of 20 degrees and full width at 90 degrees, has a flat-top intensity profile at a plan, and has uniformity within the flat top region of ±10%. Other diffusers can be used.

The collimating lens 204, in some implementations, is a UV Fused Silica Plano-Convex Lens with an effective focal length of 150 mm, a diameter of 50.8 mm, a radius of surface 1 of 69.0 mm, a radius of surface 2 of infinity, a lens thickness of 7.8 mm, and a material refractive index of 1.460. Other lens configurations can also be used.

The laser is exemplary only, and any appropriate UV light source can be used, as represented by the UV source 252. The wavelength of the light source to be used is dictated by the material used. A light source with a single wavelength or a range of wavelengths can also be used. Similarly, instead of a mirror 206, a total internal reflection prism can be used.

The DMD is, in some implementations, 1024×768 array of micro-mirrors. The dimensions of each micro mirror are 12.65 µm$^2$, with a spacing between mirrors of 1 µm. Finally, other DMD configurations can be used, and, alternatively, any appropriate dynamic mask 256 device can be used.

The energy reflected from the DMD 208, or, more generally, the dynamic mask 256, is provided to the lens 210. In some implementations, the lens is UV Fused Silica Plano-Convex Lens with an effective focal length of 75 mm, a diameter of 25.4 mm, a radius of surface 1 of 34.5 mm, a radius of surface 2 of infinity, a lens thickness of 6.7 mm, and a material refractive index of 1.460. Other lens configurations can also be used. Additionally, the lens 210 need not be a single lens. For example, any appropriate optical focusing apparatus, such as a microscope objective or a variable zoom lens can be used, as represented by the projection system 258.

In operation, there are two phases—a calibration phase and a fabrication phase. The calibration phase is used to set a rate constant for initiator decomposition as a function of depth based, in part, on incident intensity of irradiation energy at the resin chamber 104. The rate constant is used as a variable for a set of differential equations that are used, in turn, to model oxygen diffusion of a polymerization mechanism of the photopolymer resin.

The fabrication phase occurs after the calibration phase. As will describe in more detail below, a data processing apparatus 212, such as a computer, accesses target geometry data defining a target geometry of an apparatus to be generated from the photopolymer resin by the projection lithography system. The data processing apparatus 212 sets the adjusted target geometry data equal to the target geometry data for processing in an iterative loop. The adjusted target geometry data are temporary data for the iterative loop and are adjusted during the iterations. As will be described in more detail below, once the process loop meets a convergence threshold, image data based on the adjusted target geometry data, as modified from the original target data, are provided to the lithography system for fabricating parts.

During the iterative loop, the data processing apparatus 212 iteratively determines a deviation measurement based on a simulated cured geometry and the adjusted target geometry data until the deviation measurement is at or less than a threshold. In some implementations, each iteration comprises determining image data defining at least one image that is used to control irradiation of the photopolymer resin in a resin chamber, and then determining a simulated cured geometry based on an oxygen inhibition model of the photopolymer resin and the first image data. The simulated cured geometry is compared to the target geometry to determine the deviation measurement. The adjusted target geometry data is adjusted by an adjustment factor when the first deviation measurement is greater than a convergence threshold; otherwise, the data processing apparatus provides the first image data to the DMD to control exposure of the photopolymer resin.

In variations of this implementation, an apparatus having cured micro features 262 is generated using the image data output by the data processing apparatus and developed to form a final part 264. The final part is measured 266 and the data processing apparatus 212 calculates an error 268 that is a measure of the deviation of the actual geometry of the part from the target geometry. If the deviation is greater than the convergence threshold, then the data processing apparatus 212 sets the output geometry equal to the actual geometry, and the iterative process described above is repeated to generate new image data.

Section 2.0 below describes various models and calculations that are used during the fabrication phase.

2.0 Models and Calculations

The data processing apparatus 212 utilizes several models and performs calculations based on the model outputs to generate exposure data for fabricating a part from the photopolymer resin. The models and calculations are described in more detail below.

2.1 Polymerization Model

During a photopolymerization reaction, the reaction volume consists of initiator molecules, free radicals from the initiators, polymer chains, monomers, oxygen, and inhibitors if any. The dynamic concentrations of all these species are based on the reaction mechanism, which can be described through appropriate models. In the case of monofunctional acrylates, the change in concentration of all the species in a well mixed bulk reaction volume can be defined by a set of ordinary differential equations. Free Radical Photo-Polymerization reaction follows the steps shown in equations 1-9 below.

[Initiation]

$$I \xrightarrow{h\nu} 2R\cdot \quad (1)$$

$$R\cdot + M \xrightarrow{k_p} P\cdot \quad (2)$$

$$P\cdot + M \xrightarrow{k_p} P\cdot \quad (3)$$

[Propagation]

$$P\cdot + R\cdot \xrightarrow{k_p} P\cdot\cdot \quad (4)$$

$$P\cdot + P\cdot \xrightarrow{k_p} P\cdot\cdot \quad (5)$$

[Termination]

$$R\cdot + R\cdot \xrightarrow{k_t} 2R_{dead} \quad (6)$$

$$P\cdot + P\cdot \xrightarrow{k_t} P_{dead} \quad (7)$$

$$P\cdot + R\cdot \xrightarrow{k_t} P_{dead} \quad (8)$$

[Inhibition]

$$R\cdot O_2 \xrightarrow{k_{iO_2}} R_{dead} \quad (9)$$

$$P\cdot + O_2 \xrightarrow{k_{iO_2}} R_{dead} \quad (10)$$

The initiation reactions are formulated by equations 1-3, where I represents photo initiator, R. is radical, P. is one unit of a growing chain. The first step is a decomposition event where an initiator molecule is decomposed to generate two radicals in the presence of light, as indicated by equation (1). Then, the radical is free to react with a monomer, thus initiating a polymer chain, as indicated by equation (2). Polymer chains propagate via reactions with monomers, or other polymer chains. The polymer grows bigger when reaction occurs between polymer chains. The rate at which this reaction occurs is given by $k_p$ (equations 3-5).

The reactive radical centers on polymer molecules, as well as live radicals, are terminated by reacting either with a free radical or a radical that is on a chain to make dead polymer chains. The termination reactions are shown in equations 6-8, where $P_{dead}$ and $R_{dead}$ are dead polymers and radicals, respectively, at a rate of $k_t$.

In addition to the propagation and termination reactions, oxygen in the reaction volume acts as a radical scavenger, and inhibits the propagation and termination reactions. Loss of radicals to oxygen is known as oxygen inhibition, which is described by equations 9 and 10. Oxygen competes strongly for the radicals to form a stable peroxy radical. Until most of the oxygen in the reaction volume has been used up, via reaction with radicals, there is very little consumption of the monomer. The rate at which this reaction proceeds is given by $k_{toxy}$.

The rate equations for the above reactions are shown in equations 11-16 below.

$$\frac{\partial [I]}{\partial t} = -k_d[I] - D_I \left\{ \frac{\partial^2 [I]}{\partial x^2} + \frac{\partial^2 [I]}{\partial y^2} + \frac{\partial^2 [I]}{\partial z^2} \right\} \quad (11)$$

$$\frac{\partial [M]}{\partial t} = \quad (12)$$

$$-k_p[M][R\cdot] - k_p[M][P\cdot] - D_M \left\{ \frac{\partial^2 [M]}{\partial x^2} + \frac{\partial^2 [M]}{\partial y^2} + \frac{\partial^2 [M]}{\partial z^2} \right\}$$

$$\frac{\partial [P\cdot]}{\partial t} = k_p[M][R\cdot] - 2k_{tc}[P\cdot]^2 - 2k_{td}[P\cdot]^2 - 2k_t[P\cdot][R\cdot] - \quad (13)$$

$$k_{toxy}[P\cdot][O_2] - D_P \left\{ \frac{\partial^2 [P\cdot]}{\partial x^2} + \frac{\partial^2 [P\cdot]}{\partial y^2} + \frac{\partial^2 [P\cdot]}{\partial z^2} \right\}$$

-continued $$\frac{\partial [P_2]}{\partial t} = k_{te}[P\cdot]^2 + 2k_{td}[P\cdot]^2 + 2k_t[P\cdot][R\cdot] + \quad (14)$$

$$k_{toxy}[P\cdot][O_2] - D_{pd}\left\{\frac{\partial^2 [P_d]}{\partial x^2} + \frac{\partial^2 [P_d]}{\partial y^2} + \frac{\partial^2 [P_d]}{\partial z^2}\right\}$$

$$\frac{\partial [R\cdot]}{\partial t} = 2k_d[I] - k_p[R\cdot][M] - 2k_t[R\cdot]^2 - \quad (15)$$

$$k_{tO_2}[O_2][R\cdot] - D_R\cdot\left\{\frac{\partial^2 [R\cdot]}{\partial x^2} + \frac{\partial^2 [R\cdot]}{\partial y^2} + \frac{\partial^2 [R\cdot]}{\partial z^2}\right\}$$

$$\frac{\partial [O_2]}{\partial t} = \quad (16)$$

$$k_{O_2}[O_2][R\cdot] - k_{O_2}[O_2][P\cdot] - D_{O_2}\left\{\frac{\partial^2 [O_2]}{\partial x^2} + \frac{\partial^2 [O_2]}{\partial y^2} + \frac{\partial^2 [O_2]}{\partial z^2}\right\}$$

$$\text{Conversion} = \frac{M_o - M}{M_o} \quad (17)$$

In some implementations, the partial derivatives forming the terminal terms that are subtracted from each of equations (11)-(16) can be ignored.

Gelation results when the conversion of monomers reaches a specific critical value. In some implementations, a value in the range of 0.12 is used. Other values can also be used, depending on the materials used. Monomer conversion is calculated as shown in equation 17, wherein M is the concentration of monomer at a given instant in the resin and Mo is the initial concentration of the monomer in the resin sample.

In addition to the differential equations 11-16, a modification to equation 16, using the diffusion coefficient $D_{O2}$ of the oxygen in monomer, accounts for the oxygen diffusion, as shown in equation 18:

$$\frac{d[O_2]}{dt} = -k_{toxy}[O_2][R*] - k_{toxy}[O_2][P*] - D_{O_2}\left\{\frac{\partial^2 [O_2]}{\partial z^2}\right\} \quad (18)$$

The solutions to the one dimensional differential equations 11-16 and 18 are used to estimate the concentration of the reactant species. To consider the effect of oxygen diffusion in two dimensions, equation 18 can be modified to equation 19:

$$\frac{d[O_2]}{dt} = -k_{toxy}[O_2][R*] - k_{toxy}[O_2][P*] - D_{O_2}\left\{\frac{\partial^2 [O_2]}{\partial x^2} + \frac{\partial^2 [O_2]}{\partial z^2}\right\} \quad (19)$$

2.2 Rate Constants And Coefficients

The polymerization reaction starts by the decomposition of initiator molecules into free radicals in the presence of light. The rate of initiator decomposition for photopolymerization depends on the concentration of the initiator, the intensity of the light source, and the depth into the absorbing medium. Using the Beer Lambert law, the rate constant for initiator decomposition as a function of depth, z, into the sample is presented as equation 20:

$$k_d = 2.3\phi \in [In]I_0 e^{-(2.3\epsilon[In]z)}\left(\frac{\lambda}{N_A hc}\right) \quad (20)$$

Here, [In] is the concentration of the initiator, $I_0$ is the incident intensity of the light source that is determined by the calibration process. In order to convert the intensity into moles of photons per unit volume, the wavelength of the light in nanometers, $\lambda$, Avogadro's number $N_A$, Planck's constant, h, and speed of light c, are used. The value $\phi$ is the quantum yield of initiation, and it indicates the efficiency of a radical in initiating a polymerization event. In an experiment, using a trimethylolpropane triacrylate monomer and a 2,2-Dimethoxy-1,2-diphenylethan-1-one photo initiator, $\phi$ was assumed to be 0.6, a typical value for photo initiators. The value $\epsilon$ is the molar absorptivity of photons for a given initiator, and depends on the wavelength and temperature, and was determined experimentally by measuring the absorption for known quantities of initiator concentrations in a solvent of known absorption. The rate constants used in subsequent part height predictions were determined by fitting conversion from the ODE solutions to several experimental data. The following table lists the various rate constants and coefficients used to solve the mathematical model.

TABLE 1

Rate Constants and Coefficients Use to Solve Equations 11-16

| Parameter | Value | Units |
|---|---|---|
| Quantum efficiency of radical, $\phi$ | 0.6 | — |
| Molar absorptivity of photons at 325 nm wavelength, $\epsilon$ | 20 | $m^2$/mol |
| UV light Intensity, $I_0$ | 0.09 | W/$m^2$ |
| Molecular weight of Monomer, TMPTA | 296 | g/mol |
| Molecular weight of Photoinitiator, DMPA | 256 | g/mol |
| Rate constant for propagation reaction, $k_p$ | 0.26 | $m^3$/mol-s |
| Rate constant for termination reaction, $k_t$ | 0.39 | $m^3$/mol-s |
| Rate constant for termination via oxygen quenching, $k_{toxy}$ | 2 | $m^3$/mol-s |
| Diffusion coefficient of Oxygen, $D_{O_2}$ | 1e-10 | $m^2$/s |
| Initial concentration of Oxygen, $[O_2]_0$ | 1.05 | mol/$m^3$ |

Figure 3:
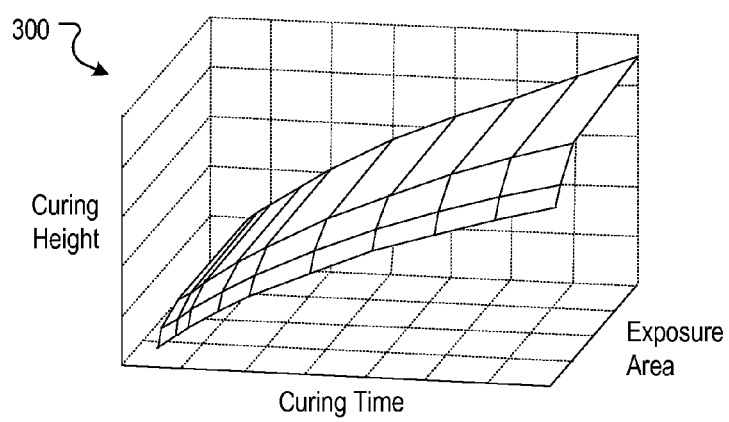
FIG. 3 is an illustration of a response surface model for a photopolymer resin.

The shape of the cured part can be estimated by tracking the regions within the sample where the conversion has reached the critical limit. The above equations can be used to predict the cured part shape for a given exposure, but not vice versa. Hence, the above equations are used to generate the response surface model of the resin to predict the cured shape for a given exposure. A sample response surface model for trimethylolpropane triacrylate is shown in FIG. 3. In some implementations, the response surface can also be generated by experimentation.

2.3 Irradiance Model and Resin Curing Curve

In some implementations, the data processing apparatus 212 utilizes an irradiance model in which irradiation paths are computed by first order ray tracing. The irradiance model models the irradiance received by the resin in terms of the process parameters. The irradiance distribution on the resin depends upon the power distribution across the light beam incident on the bitmap and upon the optical aberrations caused by the imaging lens. In some implementation in which a DMD is used, the irradiance distribution across a beam incident on the DMD is assumed to be uniform and the value is measured using a radiometer. This irradiance is one of the inputs to the irradiance model. The irradiance, $H(pr_i)$ at a point in the resin can be given by equation 21:

$$H(pr_i) = c\sum_{j=1}^{n}\sum_{k=1}^{m}\delta(p_j, v_k, pr_i) \quad (21)$$

where c is a constant. The value $\delta$ is a function introduced to evaluate whether a particular ray will strike an infinitesimal area centered on a given point on the resin or not. The value $p_j$ corresponds to the number of points $p_1, p_2 \ldots p_n$ on the DMD. The terms $v_1, v_2 \ldots v_m$ represent direction vectors in which ray are emitted from a point on the DMD. The points $pr_1, pr_2 \ldots pr_x$, are points on the substrate.

For a point $pr_i$, the exposure $E(pr_i)$ is given by $E(pr_i)=H(pr_i) \times t$, where t is the exposure time at this point. A resin point is cured if the exposure received by this point is greater than the threshold exposure of polymerization $E_c$. Thus, the variation in exposure with depth in the resin follows the Beer Lambert law of absorption. Thus, at a height Z, the exposure will be $E(pr_i, z)=E(pr_i)e^{-z/D_p}$ where $D_p$ is the depth of penetration of the resin. However, attenuation through the cured portion $D_{pS}$ of the resin differs from attenuation though the liquid portion $D_{pL}$. In particular, the attenuation through the cured portion is less than through the liquid portion. Using a Taylor series expansion and omitting higher order terms, a solution to a resulting differential equation is given by equation 22:

$$z = D_{pS} \ln\left( \frac{D_{pL}}{D_{pS}} \cdot \frac{E}{E_c} + 1 - \frac{D_{pL}}{D_{pS}} \right) \tag{22}$$

Equation 22 defines a resin working curve of cured height z relative to an exposure E. The values of $E_c$, $D_{pS}$, and $D_{pL}$ for a value E can be determined for a particular resin by curve fitting to fit actual results.

2.4 Example Image Data Calculation

The irradiance produced by a micro-mirror on a pixel in resin is represented as $H_{ijkl}$, where ij corresponds to the pixels on the substrate and kl corresponds to the number of micro-mirrors on the DMD mask. Accordingly, given a geometry of a part $Z=G(x, y)$, and resin properties of penetration depths for solid and liquid portions, and critical exposure $E_c$, the exposure time for every micro-mirror $T_{kl}$ can be optimized using an optimization process. One example optimization process is a least squares optimization to find the exposure time for each micro-mirror. The optimization is described by equation 23:

$$S = \sum_{i=1}^{N} \sum_{j=1}^{M} (E_{ij} - \tilde{E}_{ij})^2 = \sum_{i=1}^{N} \sum_{j=1}^{M} \left( E_{ij} - \sum_{k=1}^{P} \sum_{i=1}^{Q} H_{ijks} * \tilde{T}_{kl} \right) \tag{23}$$

Other optimization processes can also be used.

After the time of exposure for each micro-mirror is obtained, a K-means clustering algorithm is applied to classify $T_{kl}$ into a certain number of clusters. Other clustering processes, however, can also be used in lieu of K-means clustering. In this example implementation, the objective of K-means clustering algorithm is to minimize total intra-cluster variance. The set of $T_{kl}$ values is divided into clusters, in which the intra-cluster variance V is minimized according to equation 24.

$$V = \sum_{i=1}^{K} \sum_{T_{kl} \in S_i} (T_{kl} - \bar{T}_b)^2 \tag{24}$$

Here, the value of i ranges from 1 to k, where k is a number of resulting bitmaps for image data. $S_i$ is the $i^{th}$ cluster and $T_b$ (bar) is the corresponding average exposure time. To ensure that each pixel on the substrate gets continuous curing until the desired thickness, the average values of each cluster are sorted in an ascending order according to equation 25:

$$T_{kl} \xrightarrow{Clustering} \bar{T}_b; \; 1 \le b \le K \tag{25}$$

$$\xrightarrow{Sort \; ascending} \bar{T}_i \le \bar{T}_{i+1};$$

$$1 \le i \le K-1$$

The value of exposure time for a bitmap $B_i$ is computed as follows:

$$t_i = \begin{cases} \bar{T}_i & i = 1 \\ \bar{T}_i - \bar{T}_{i-1} & 2 \le i \le K \end{cases} \tag{26}$$

$$B_i^{(kl)} = \begin{cases} 0 & \bar{T}_i < T_{kl} \\ 1 & \bar{T}_i \ge T_{kl} \end{cases}, \; \forall k, l \tag{27}$$

In equation 27, $B^{(kl)}$ denotes the $(k \times l)^{th}$ micro-mirror on the DMD. The value of 0 corresponds to an "ON" state, and the value of 1 corresponds to an "OFF" state.

Figure 4A:
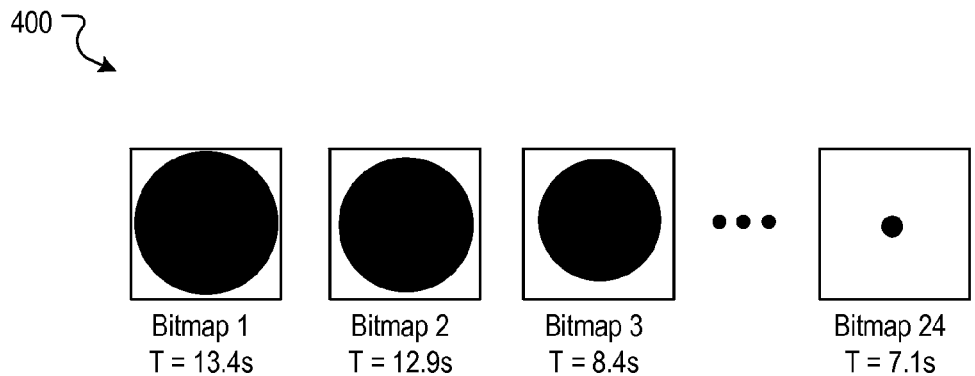
FIG. 4A is an illustration of exposure bitmaps.

FIG. 4A is an illustration of exposure bitmaps 400. In this example, 24 bitmaps are created with varying exposure times. In operation, the system 200 utilizes the bitmaps to control the DMD, which in turn controls the exposure of the resin.

Figure 4B:
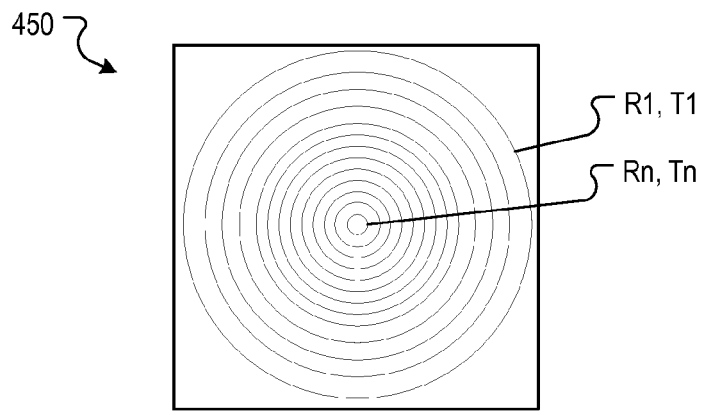
FIG. 4B is an illustration of an aggregated exposure gradient.

The multiple bitmaps are one example set of image data. In other implementations in which a mask can be controlled using aggregated data, such as a gray scale image, the aggregated exposure gradient 450 of FIG. 4B can be used. In FIG. 4B, the example gradient is viewed from the top, with the largest radius R1 having an exposure time of T1, and the smallest radius Rn having an exposure time of Tn. In this example, the value of Tn is greater than T1, which will result in concave shaped part having an apex at its center.

The use of the oxygen inhibition model described in sections 2.1 and 2.2 helps to minimize the effects of under-curing that are not accounted for by irradiance model and resin curve data, as these latter models do not detail the chemical mechanisms underlying the polymerization process. The oxygen inhibition model helps reduce the effects of under-curing near the edges and accounts for the inhibitor (e.g., Oxygen) present within the resin diffusing into the region of polymerization and competing with the monomer to terminate the polymerization reactions. This allows for much more accurate reproduction and repeatability of desired part geometries.

2.5 Non-Uniform Substrates

When using uniform (e.g., flat) substrates, the irradiation energy required at the base of the substrate is equal across the entire substrate. However, when the surface of the substrate is not uniform, e.g., the surface is curved, the data processing apparatus 212 utilizes a unique voxel discretization process to convert the dimensions of the desired part height into the required exposure at the base of the substrate.

Figure 5:
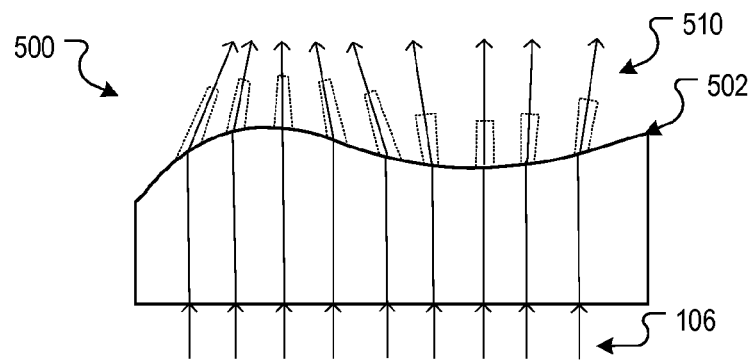
FIG. 5 is an illustration of voxels determined for a curing surface.

FIG. 5 is an illustration 500 of voxels 510 determined for a curing surface 502. The curing surface is curved, and thus the incident light is refracted at the surface due to refractive index mismatch. Accordingly, the voxels 510 are calculated along the path of incident light irradiation. Ray tracing can be used to obtain the path of incident irradiation. The refractive indices of the substrate and the resin are known, and the irradiation angle with respect to the substrate is calculated using these values. The height of the model is then calculated along the irradiation paths of each voxel. Having known the spatial height to be cured, the desired exposure values can be determined by using the relevant resin working curve. From the size perspective, the voxels must be small so as to capture the optical aberration effects. However, very small voxels may result in unrealistic time to complete the optimization required for generating image data. Hence, there is a tradeoff between computation speed and overall accuracy in determining the size of the voxels. The tradeoff can be determined by a user.

3.0 Process Flow

Figure 6:
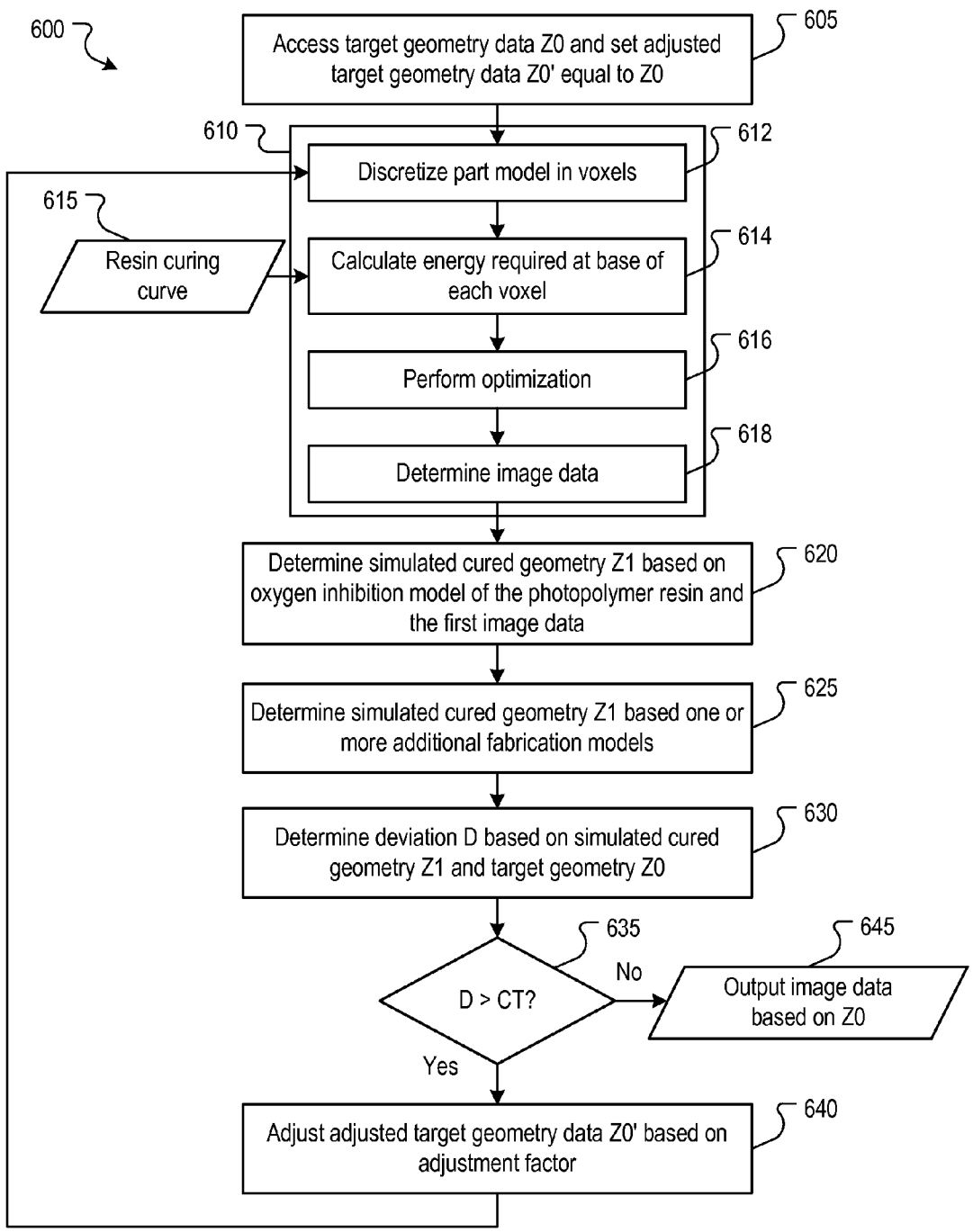
FIG. 6 is a flow chart of an example process for curing a photopolymer resin.

FIG. 6 is a flow chart of an example process 600 for curing a photopolymer resin. The process 600 can, for example, be implemented in the data processing apparatus 212 of FIGS. 2A and 2B.

The process 600 accesses target geometry data defining a target geometry of an apparatus to be generated from a photopolymer resin by the projection lithograph system and sets an adjusted target geometry data equal to the target geometry data (605). For example, the target geometry data may define the dimensions of a lens to be fabricated. The data processing apparatus 212 sets the output geometry equal to the target geometry so that that output geometry may be modified during the iterative process below while the original target geometry values are retained.

The process 600 generates an initial set of image data (610). The image data are used to control the exposure of the resin, and the initial set can be generated by any appropriate process. One example process includes discretizing the part model in voxels (612). For example, the data processing apparatus 212 generates the voxels based on the adjusted target geometry data and the shape of the substrate.

Using the resin curing curve 615, the process 600 calculates the energy required at the base of each voxel. For example, the data processing apparatus 212 calculates, based on the voxel, and based on the cure curve data 615, the amount of irradiation energy required at the base of each voxel (or at the base of the substrate and as attenuated at the base of the voxel) to cure the resin can be computed.

The process 600 performs optimization (616). For example, the data processing apparatus 212 can determine an irradiance model $H_{ijkl}$, as described above, and perform a least squares optimization to determine an exposure time for every micro-mirror $T_{kl}$.

The process 600 determines image data (618). For example, a clustering algorithm can be used to determine multiple exposure bitmaps that are used to control exposure of the resin.

The example process steps 612-618 are but one implementation that can be used to generate the image data. Other processes and algorithms can also be used to generate alternate bitmaps or even a single aggregated set of exposure data, as described above.

To account for the curing mechanics, the process 600 determines the simulated cured geometry based on an oxygen inhibition model of the photopolymer resin and the first image data (620). For example, the data processing apparatus 212 determines the simulated cured geometry based on rates of initiation, propagation, termination and inhibition mechanisms of the photopolymer resin, as described in section 2.1 and 2.2. A rate constant for initiator decomposition can be set during a calibration phase during which the incident intensity for the resin chamber is determined. The rate constant for initiator decomposition is determinative of the differential change in concentration of an initiator in the photopolymer resin with respect to time, and is set as a function of depth based, in part, on the incident intensity, as described in section 2.2. Using this rate constant value, and other values that are based on the resins and initiators used, the data processing apparatus 212 further calculates the cured part shape for a given exposure, as described in sections 2.1 and 2.2.

In some implementations, the process 600 optionally considers one or more additional fabrication models that take into account additional factors (625). These additional factors include optical self-focusing, developing effects, developer erosion, mechanical erosion, and shrinkage.

Figure 7:
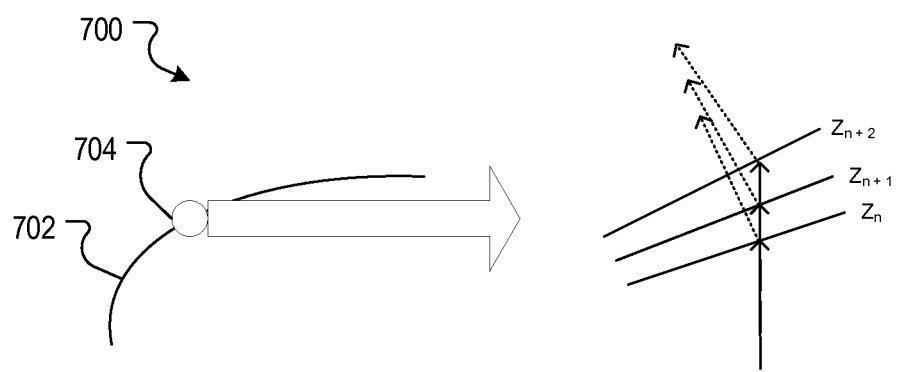
FIG. 7 is an illustration of an optical self-focusing effect during curing.

In some implementations, the optical self focusing model models the intensity of irradiation energy emerging out of the simulated cured geometry at instantaneous heights z. FIG. 7 is an illustration 700 of an optical self-focusing effect during curing. The surface 702 for a small region 704 is shown in detail during a curing process at various heights $Z_n$, $Z_{n+1}$, and $Z_{n+2}$. As the part cures, for every differential change in height Z the angle at which the light is incident with the surface and the intensity of the light likewise changes by a differential amount. As a result, the direction of the light changes, which alters the curing process.

The process 600 utilizes the total exposure time of each region of the part to determine the effects of optical self focusing. For example, the data processing apparatus 212 discretizes the exposure time into time increments that are sub-portions of the total exposure time. For each of the time increments, and for each location on the surface of the simulated cured geometry, the data processing apparatus 212 determines an instantaneous height z of the surface of the simulated cured geometry at the location and at a time corresponding to the time increment. The height is determined using the data described in 610 and 612 above. The data processing apparatus 212, for each location on the surface of the simulated cured geometry, then determines an intensity of irradiation energy emerging out of the surface of the simulated cured geometry at the location and a corresponding ray path for the irradiation energy. Finally, for each location on the surface of the simulated cured geometry, based on the based on the intensity, the height z, and the ray path, the data processing apparatus 212 determines a change in the instantaneous height z of the surface at the location. This change in instantaneous height z corresponds to the instantaneous height z for a next time increment, e.g., $Z_{n+1}=Z_n+dZ$, where dZ is the change in instantaneous height. The process continues until the total exposure time is reached.

Other factors that can be considered include volumetric shrinkage of the cured photopolymer resin, chemical erosion attributed to developer solution and processing, and the like. These values can be measured empirically and/or obtained from manufacturer's data sheets.

The process 600 determines a deviation measurement D based on the simulated cured geometry and the target geometry (630). The deviation measurement can, for example, be based on a percentage difference of portions of the target geometry from the simulated cured geometry, or any other appropriate measurement that can be used to determine how closely the simulated cured geometry is to the target geometry.

The process 600 compares the deviation measurement to a convergence threshold CT (635). For example, if the deviation measurement is a percentage, the convergence threshold may be +/−2%. Other thresholds can also be used.

If the deviation measurement is greater than the convergence threshold, then the process 600 adjusts the adjusted target geometry data by an adjustment factor. For example, the adjustment factor can be a change based on the difference between the target geometry and the simulated cured geometry, e.g., if the deviation is |Z0 (target geometry)−Z1 (simulated geometry)| then the adjustment may be the resetting of the output geometry to 2*Z0−Z1 or 2*Z0+Z1, depending on the value of the deviation. The process 600 then performs another iteration beginning at 610.

If, however, the deviation measurement is less than the convergence threshold, then the process 600 provides the image data based on Z0 to the projection lithography system. The lithography system then fabricates parts using the image data that has been provided.

In some implementations, the manufactured part can be measured and the data processing apparatus calculates an error that is a measure of the deviation of the actual geometry of the part from the target geometry. If the deviation is greater than the convergence threshold, then the data processing apparatus 212 sets the adjusted target geometry data equal to the actual geometry data, and the process 600 resumes at step 610 for further adjustments. The additional adjustments can be used for final adjustments before full scale fabrication.

4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by a data processing apparatus comprising:
   accessing, in a database communicably coupled to the data processing apparatus, by the data processing apparatus, target geometry data that defines a target geometry of an apparatus to be generated by a projection lithography system, from a photopolymer resin, wherein the projection lithography system is in communication with the data processing apparatus;
   setting an adjusted target geometry equal to the target geometry;
   iteratively determining a deviation measurement, the deviation measurement based on a difference between the adjusted target geometry and a simulated cured geometry, the deviation measurement determined until the deviation measurement is less than or equal to a convergence threshold, each iteration comprising:
      generating, based on the adjusted target geometry, image data that defines at least one bitmap and corresponding exposure time for use by the projection lithography system to control irradiation of the photopolymer resin in a resin chamber of the projection lithography system;
      simulating, based on the image data and an oxygen inhibition model of the photopolymer resin, the apparatus to be generated to determine the simulated cured geometry;
      calculating the difference between the adjusted target geometry and the simulated cured geometry to determine the deviation measurement;
      comparing the deviation measurement to the convergence threshold; and
      responsive to determining that the deviation measurement is greater than the convergence threshold, adjusting the adjusted target geometry by an adjustment factor; and
   responsive to determining that the deviation measurement is less than or equal to a convergence threshold, providing the image data to the projection lithography system for use in controlling the irradiation of the photopolymer resin in the resin chamber when generating the apparatus.

2. The method of claim 1, wherein the simulated cured geometry is further based on rates of initiation, propagation, and termination of the photopolymer resin, and inhibition mechanisms of the photopolymer resin.

3. The method of claim 2, wherein, prior to accessing the target geometry, the method further comprises:
   determining an incident intensity of an irradiation source of the projection lithography system; and
   setting a rate constant for initiator decomposition as a function of depth in the photopolymer resin based, based at least in part, on the incident intensity;
   wherein the rate constant for initiator decomposition is determinative of a differential change in concentration of an initiator in the photopolymer resin with respect to time, and
   wherein the rate constant is used as a variable for a set of differential equations used to model oxygen diffusion during a curing process.

4. The method of claim 1, wherein, prior to accessing the target geometry, the method further comprises:
   determining an incident intensity of an irradiation source at the resin chamber of the projection lithography system; and
   setting a rate constant for initiator decomposition as a function of depth in the photopolymer resin based, at least in part, on the incident intensity;
   wherein the rate constant for initiator decomposition is determinative of a differential change in concentration of an initiator in the photopolymer resin with respect to time, and
   wherein the rate constant is used as a variable for a set of differential equations used to model oxygen diffusion during a curing process.

5. The method of claim 1, wherein determining the simulated cured geometry further comprises determining the simulated cured geometry based, in part, on an optical self focusing model that models the intensity of irradiation energy emerging out of the simulated cured geometry at instantaneous heights $z$.

6. The method of claim 5, wherein determining the simulated cured geometry based, in part, on an optical self focusing model comprises:
   determining, for each of plurality of time increments, each of which are a sub-portion of a total exposure time, and for each of a plurality of locations on a surface of the simulated cured geometry:
      determining an instantaneous height $z$ of the surface of the simulated cured geometry at the location and at a time corresponding to the time increment;
      determining an intensity of irradiation energy emerging out of the surface of the simulated cured geometry at the location and a corresponding ray path;
      estimating, based on the intensity, the height $z$, and the ray path, a change in the instantaneous height $z$ of the surface at the location, the change in the instantaneous height z corresponding to the instantaneous height z for a next time increment.

7. The method of claim 1, further comprising:
determining, by the data processing apparatus, the simulated cured geometry based on volumetric shrinkage of the cure photopolymer resin.

8. The method of claim 1, further comprising:
determining, by the data processing apparatus, the simulated cured geometry based on chemical erosion attributed to developer solution.

9. The method of claim 1, wherein generating image data that defines at least one bitmap and corresponding exposure time for use by the projection lithography system to control irradiation of the photopolymer resin in a resin chamber of the projection lithography system comprises:
discretizing, into a plurality of voxels, the target geometry data that defines the target geometry of the apparatus to be generated; and
determining an amount of irradiation energy required at a base of each voxel in the plurality of voxels.

10. The method of claim 9, wherein generating image data that defines at least one image for use by the projection lithography system to control irradiation of the photopolymer resin in a resin chamber of the projection lithography system further comprises:
mapping each bit in a particular bitmap to a corresponding voxel in the plurality of voxels, wherein each bit in a particular bitmap defines a corresponding irradiation energy value that specifies to the projection lithography system the irradiation energy required at the base of the voxel at the corresponding exposure time.

11. The method of claim 1, wherein the image data is first image data and the deviation measurement is a first deviation measurement, further comprising:
receiving, by the data processing apparatus, actual geometry data that defines an actual geometry of an apparatus generated by the projection lithography system using the first image data;
setting the adjusted target geometry equal to the actual geometry;
iteratively determining a second deviation measurement, the second deviation measurement based on a difference between the adjusted target geometry and a simulated cured geometry, the second deviation measurement determined until the second deviation measurement is less than or equal to the convergence threshold, each iteration comprising:
generating, based on the adjusted target geometry, second image data that defines at least one image that is used to control irradiation of the photopolymer resin in the resin chamber of the projection lithography system;
determining, based on the second image data and the oxygen inhibition model of the photopolymer resin, the simulated cured geometry;
calculating the difference between the adjusted target geometry and the simulated cured geometry data to determine the second deviation measurement;
comparing the second deviation measurement to the convergence threshold; and
responsive to determining that the second deviation measurement is greater than the convergence threshold, adjusting the adjusted target geometry by an adjustment factor; and
providing the second image data to the projection lithography system.

12. A non-transitory computer readable storage device storing instructions executable by a data processing apparatus that upon such execution cause the data processing apparatus to perform operations comprising:
accessing, in a database communicably coupled to the data processing apparatus, by the data processing apparatus, target geometry data that defines a target geometry of an apparatus to be generated by a projection lithography system, from a photopolymer resin, wherein the projection lithography system is in communication with the data processing apparatus;
setting an adjusted target geometry equal to the target geometry;
iteratively determining a deviation measurement, the deviation measurement based on a difference between the adjusted target geometry and a simulated cured geometry, the deviation measurement determined until the deviation measurement is less than or equal to a convergence threshold, wherein each iteration comprising:
generating, based on the adjusted target geometry, image data that defines at least one bitmap and corresponding exposure time for use by the projection lithography system to control irradiation of a photopolymer resin in a resin chamber of the projection lithography system;
simulating, based on the image data and an oxygen inhibition model of the photopolymer resin, the apparatus to be generated to determine the simulated cured geometry;
calculating the difference between the adjusted target geometry and the simulated cured geometry to determine the deviation measurement;
comparing the deviation measurement to the convergence threshold; and
responsive to determining that the deviation measurement is greater than the convergence threshold, adjusting the adjusted target geometry by an adjustment factor; and
responsive to determining that the deviation measurement is less than or equal to a convergence threshold, providing the image data to the projection lithography system for use in controlling the irradiation of the photopolymer resin in the resin chamber when generating the apparatus.

* * * * *